United States Patent [19]
Lorensen et al.

[11] Patent Number: 5,598,959
[45] Date of Patent: Feb. 4, 1997

[54] ARTICLE-CARRYING RACK WITH LOCKABLE MOUNT

[75] Inventors: Robbin R. Lorensen; Joseph J. Settelmayer, both of Eureka, Calif.

[73] Assignee: Yakima Products, Arcata, Calif.

[21] Appl. No.: 499,037

[22] Filed: Jul. 6, 1995

[51] Int. Cl.$^6$ .................................................. B60R 9/00
[52] U.S. Cl. ........................................ 224/315; 224/924
[58] Field of Search ................................. 224/315, 535, 224/569, 924, 425, 426, 427; 403/110, 373, DIG. 4; 70/233

[56] References Cited

U.S. PATENT DOCUMENTS

| | | |
|---|---|---|
| 3,239,115 | 3/1966 | Bott et al. . |
| 3,828,993 | 8/1974 | Carter . |
| 3,848,784 | 11/1974 | Shimano et al. . |
| 4,114,409 | 9/1978 | Scire . |
| 4,274,569 | 6/1981 | Winter et al. . |
| 4,629,104 | 12/1986 | Jacquet . |
| 4,724,692 | 2/1988 | Turin et al. . |
| 4,887,754 | 12/1989 | Boyer et al. . |
| 4,934,572 | 6/1990 | Bowman et al. . |
| 4,964,287 | 10/1990 | Gaul . |
| 5,005,390 | 4/1991 | Giannini et al. . |
| 5,037,019 | 8/1991 | Sokn . |
| 5,042,705 | 8/1991 | Johansson . |
| 5,052,605 | 10/1991 | Johansson . |
| 5,065,921 | 11/1991 | Mobley . |
| 5,118,125 | 6/1992 | Plunkett . |
| 5,169,044 | 12/1992 | Englander . |
| 5,226,341 | 7/1993 | Shores . |
| 5,232,134 | 8/1993 | Allen . |
| 5,275,319 | 1/1994 | Ruana ................................. 224/924 |
| 5,291,763 | 3/1994 | Cuisinot . |
| 5,492,258 | 2/1996 | Brunner .......................... 224/315 X |
| 5,511,894 | 4/1996 | Ng .................................... 224/924 |

*Primary Examiner*—Renee S. Luebke
*Attorney, Agent, or Firm*—Kolisch, Hartwell, Dickinson, McCormack & Heuser

[57] ABSTRACT

An article-carrying rack with a lockable mount for securing the rack to a vehicle is described. The lockable mount includes a first half and a second half connected to the first half for movement relative thereto between an opened and a closed position. A lock-carrying member is mounted on the first half and includes a first and second end. A lock is mounted adjacent the first end of the lock-carrying member and is movable along the lock-carrying member for varying the distance between the lock and the first half. The lock-carrying member may be locked to restrict such movement. The lock-carrying member also includes an engagement member mounted adjacent the second end for selectively engaging the first and second halves when the second half is in the closed position and confining the second half in such position when the lock is locked.

20 Claims, 7 Drawing Sheets

ARTICLE-CARRYING RACK WITH LOCKABLE MOUNT

BACKGROUND AND SUMMARY OF THE INVENTION

This invention relates generally to article-carrying racks, more particularly it concerns an article-carrying rack with a lockable mount which allows the rack and mount to be locked in place on a vehicle, whether articles are carried thereon or not.

Article-carrying racks are well known and come in many shapes and sizes for carrying a variety of articles. Certain types of article-carrying racks are mountable on vehicles, such as cars or trucks, for carrying articles such as bicycles. Some racks are convertible for carrying other types of articles such as luggage, giving such racks added utility for the owners.

Some of the racks which are useful for carrying bicycles require the front wheel of the bicycle to be removed so that the front forks may be clamped to a skewer which is, in turn, fixed on a frame. One problem with racks of this type, and more generally, article-carrying racks, is that when the articles are removed, e.g., bicycle, luggage, etc., the rack may be easily removed from the vehicle if it is not locked in place. Of those racks which may be locked in place on a vehicle, many may be easily removed with a screw driver, wrench, or specialized tool such as an Allen wrench or the like. Some racks may have even more specialized tools for use in applying or removing the rack, but, if someone other than the owner has a similar tool, such rack may be easily and needlessly removed.

With the above problems in mind it is a general object of the invention to provide an article-carrying rack which may be mounted on a vehicle and locked into place regardless of whether articles are carried thereon.

It is another object of the present invention to provide an article-carrying rack with a lockable mount for use on a vehicle which may be locked into place on the vehicle without the use of any tools, and remain locked in place whether or not articles are carried thereon or not.

It is yet another object of the present invention to provide a lockable fork mount for use with a vehicle-mounted, bicycle-carrying rack which meets any or all of the objects discussed herein.

It is a further object of the present invention to provide a rack with a lockable mount which meets the above objects, is easy to manufacture, and durable enough to withstand the uses to which it may be put.

The invention achieves these and other objects in the form of an article-carrying rack with a lockable mount for securing the rack to an external bar on a vehicle. The mount includes a first half and a second half which is connected to the first half for movement relative thereto between an opened and a closed position. When the second half is in the closed position it is engaged by the first half for securing the halves around the external bar. A lock-carrying member includes a first and second end and is mounted on the first half. A lock is mounted adjacent the first end and is movable along the lock-carrying member for varying the distance between the member and the first half. The lock-carrying member may be locked to restrict such movement. The lock-carrying member also includes an engagement member mounted adjacent the second end for selectively engaging the first and second halves when the halves are in the closed position, and confining the halves in such position when the lock is locked.

These and additional objects and advantages of the present invention will be more readily understood after a consideration of the drawings and the detailed description of the preferred embodiment.

DETAILED DESCRIPTION OF THE PREFERRED EMBODIMENT

Figure 1:
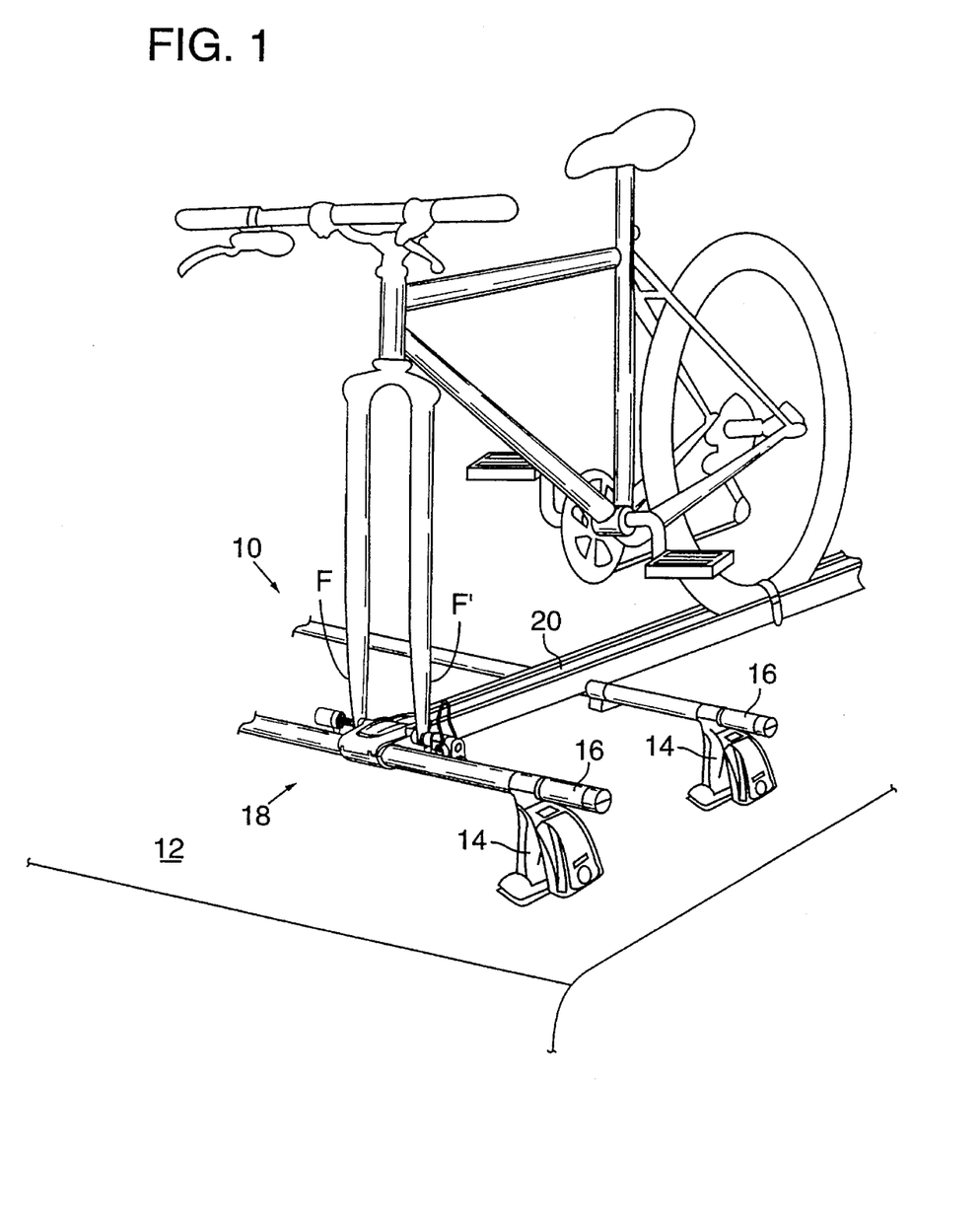
FIG. 1 is an isometric view of an article-carrying rack with a lockable mount for securing the rack to a vehicle, according to the preferred embodiment of the present invention.

An article-carrying rack with a lockable mount for securing the rack to a vehicle according to the preferred embodiment of the present invention, is shown generally at 10 in FIG. 1 where the rack may be seen to be mounted on a vehicle roof 12.

Rack 10 includes plural stanchions 14 mounted on roof 12, and plural bars 16 mounted on stanchions 14 as shown. The other ends of bars 16 may be mounted on roof-mounted stanchions similar to those shown, or on window-mounted stanchions.

A lockable mount, shown generally at 18, is connected to a tray 20 for holding articles to be carried on roof 12, and secured on bar 16 as shown. It will be understood that tray 20 may be dedicated or adapted for carrying various other articles commonly carried exteriorly of a vehicle and that a bicycle is shown mounted on tray 20 to illustrate the preferred embodiment only. It will further be understood that by article is meant any article commonly carried exteriorly of a vehicle, such as luggage carried on or in luggage racks or mounts, skis and ski boots carried on or in ski racks or mounts, and kayaks, canoes, rafts or other water-usable apparatuses carried on or in water sport racks or mounts, to name just a few.

Figure 2:
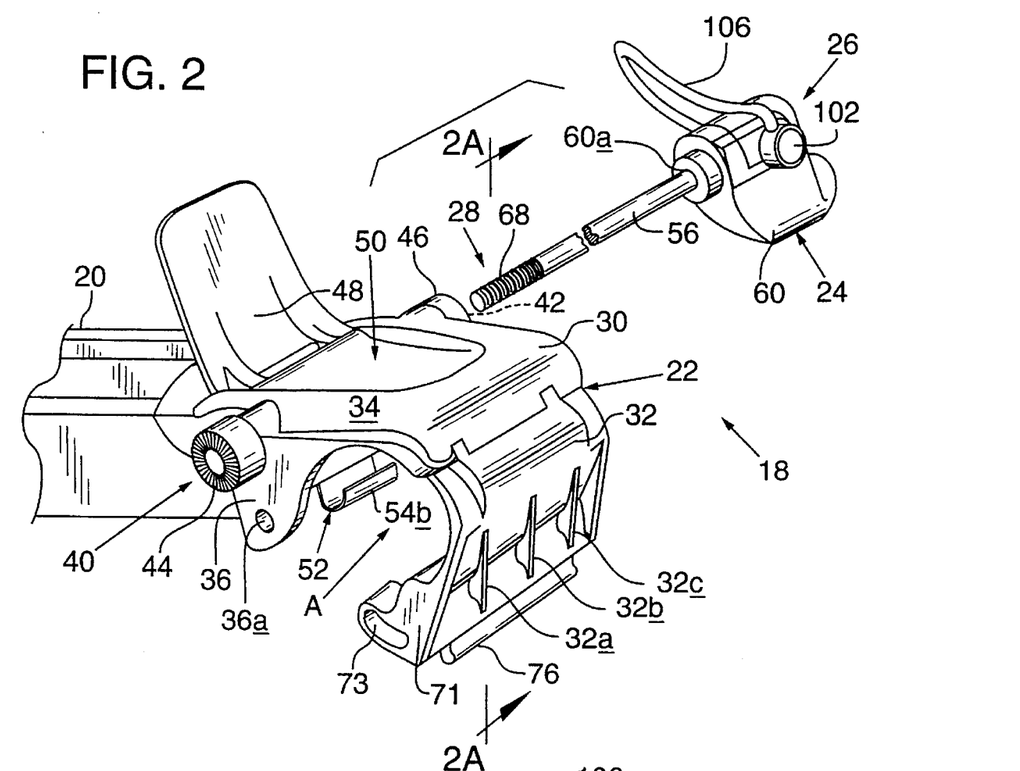
FIG. 2 is an isometric, enlarged view of the lockable mount of the rack of FIG. 1, constructed according to the preferred embodiment of the present invention, and showing the mount in an opened position.
Figure 2A:
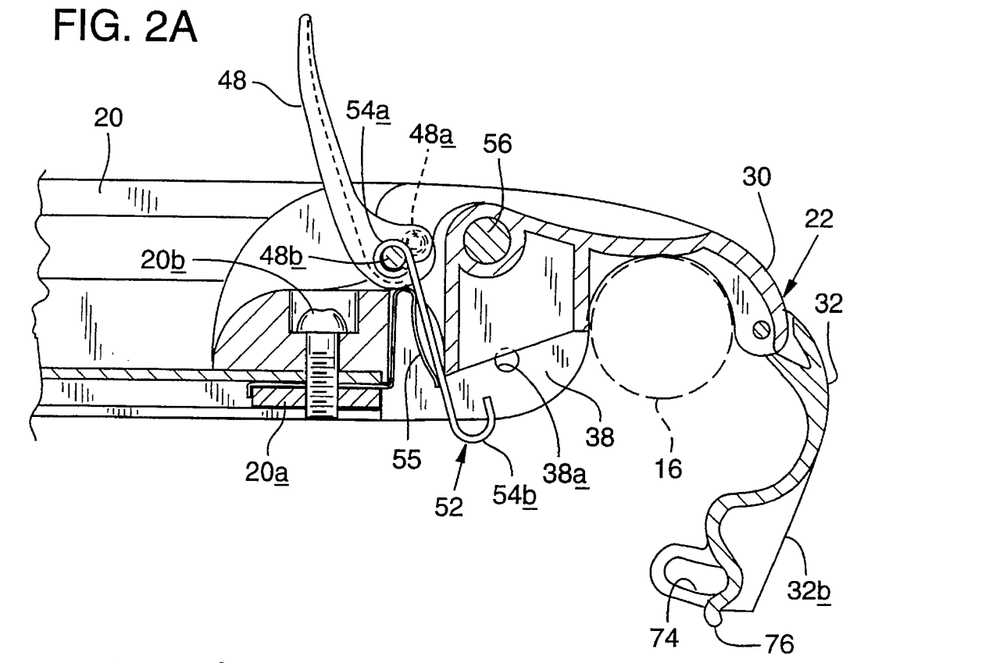
FIG. 2A is a view taken along line 2A—2A in FIG. 2, showing the mount in the opened position.
Figure 2B:
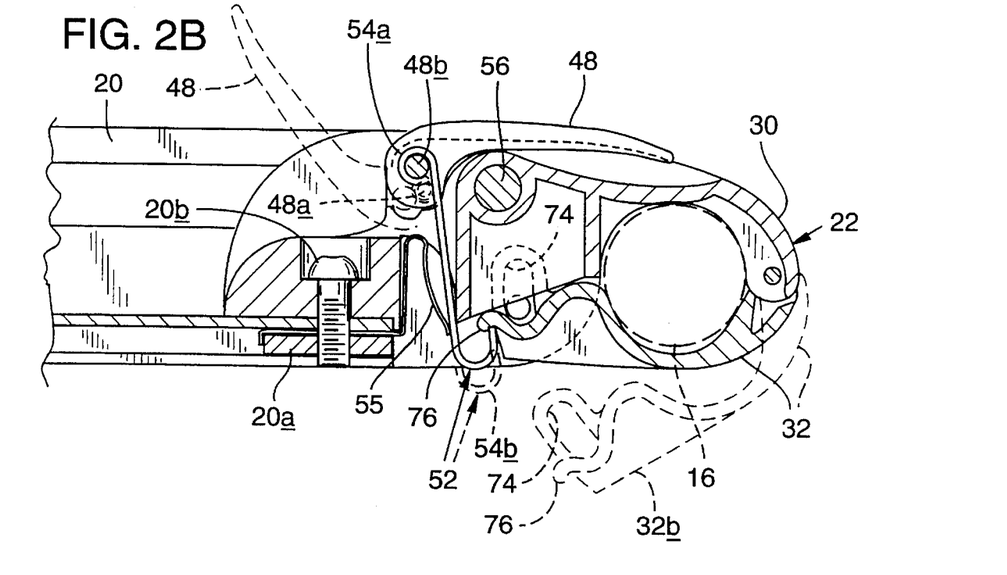
FIG. 2B is a view similar to the view shown in FIG. 2A, only showing the mount in a closed position.

FIG. 2 shows lockable mount 18 in more detail where it may be seen to include two separate parts. A first part, referred to hereinafter as a mounting member 22, is connected to tray 20 and securable on a bar 16 as shown in FIG. 1. The connection between tray 20 and mounting member 22 is shown in FIGS. 2A and 2B where it may be seen that tray 20 is securely clamped between a washer 20a and mounting member 22, with such washer being held in place by a screw 20b. A second part of lockable mount 18, referred to hereinafter as a lock-carrying member 24, is mounted on mounting member 22 and includes a first end 26 and a second end 28.

Figure 3:
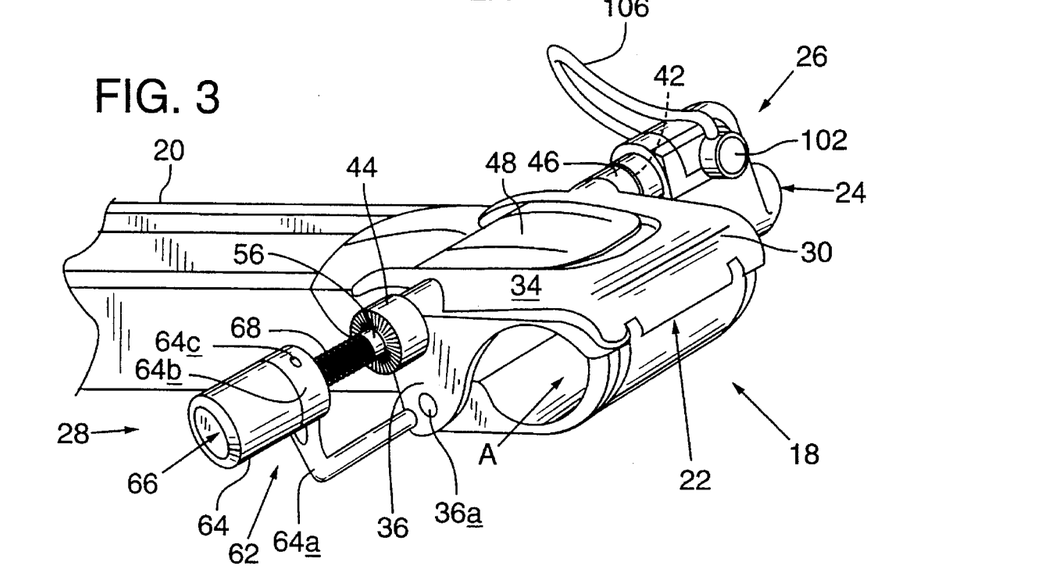
FIG. 3 is a view which is similar to FIG. 2, only showing the mount in the closed position, and showing an engagement member for engaging the mount when the mount is in the closed position.
Figure 4:
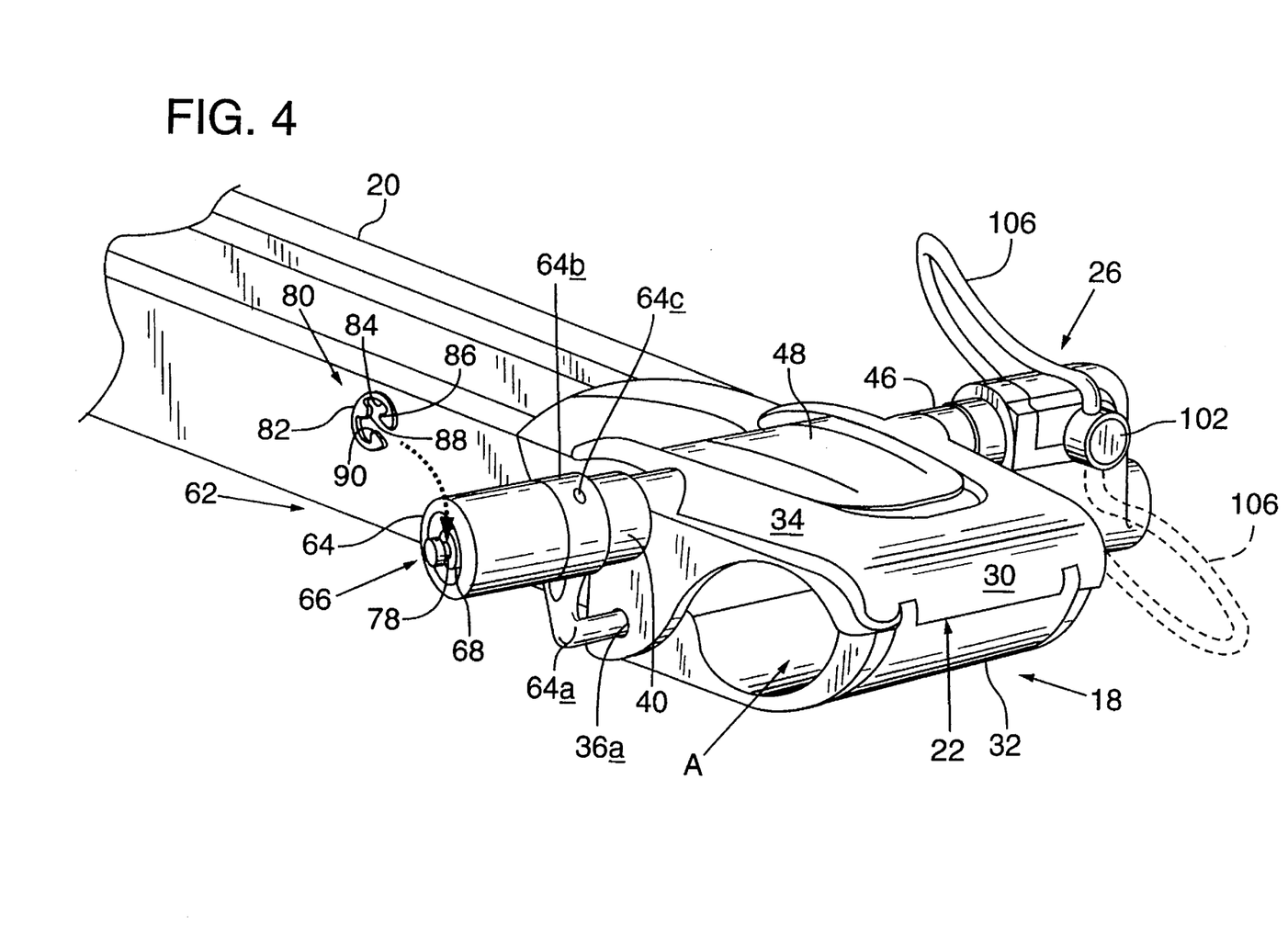
FIG. 4 is a view which is similar to FIG. 3, showing the engagement member engaging the mount, and stop structure according to the preferred embodiment of the invention.
Figure 5:
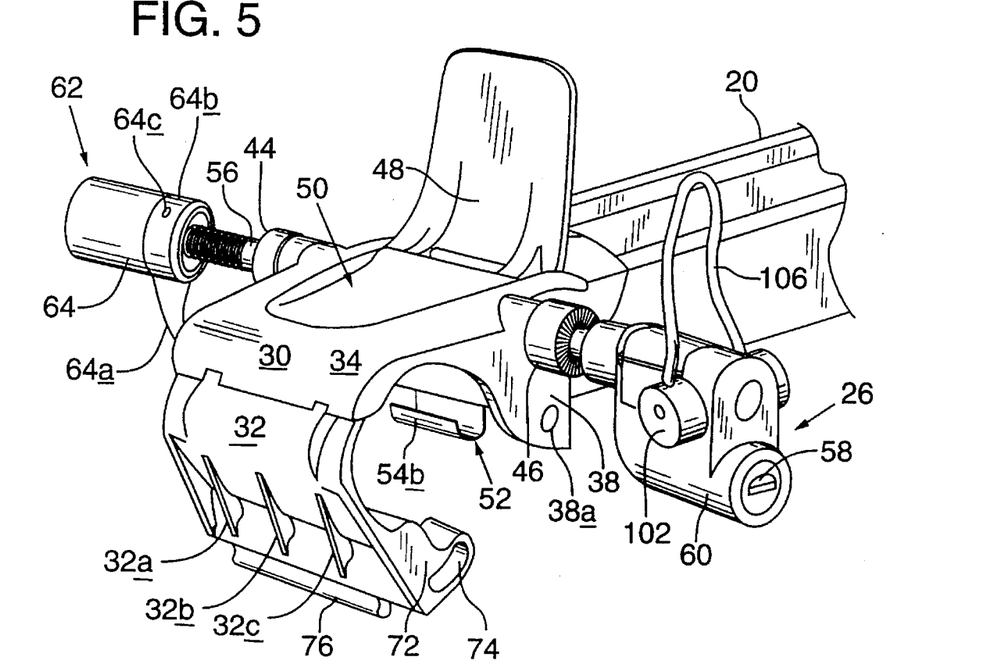
FIG. 5 is an isometric view of the lockable mount, showing the mount rotated 90-degrees from the view shown in FIG. 3, and showing the mount in the opened position.
Figure 6:
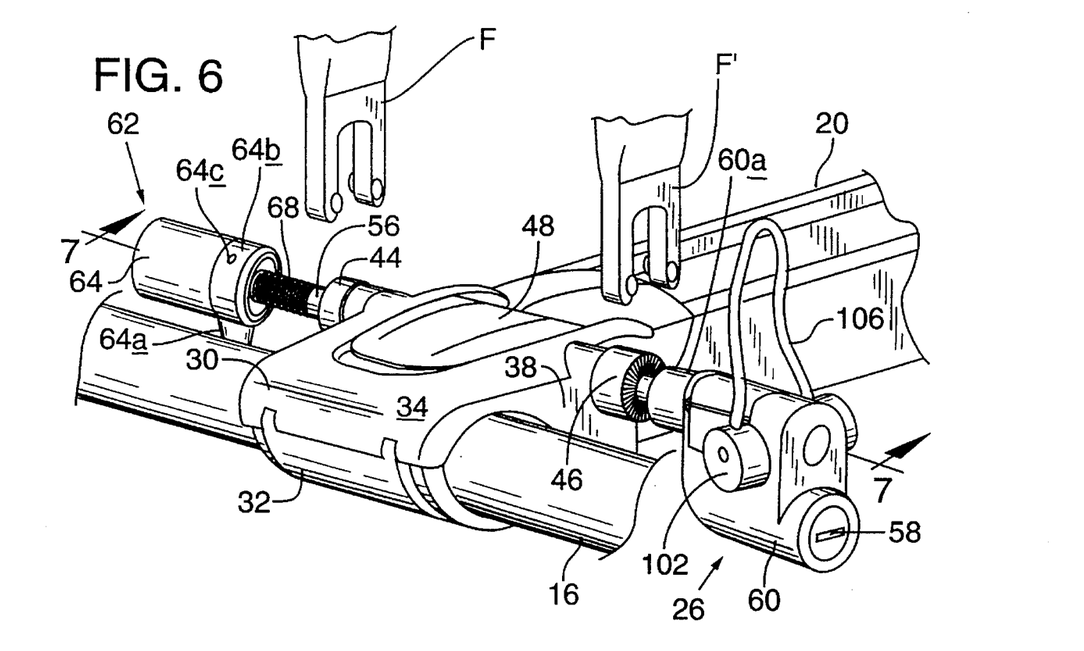
FIG. 6 is a view which is similar to FIG. 5, only showing the mount in the closed position, clamped around a bar, and prepared for receiving the front forks of a bicycle.

The first part of lockable mount 18 will be described by referring collectively to FIGS. 2 through 6 where mounting member 22 may be seen to include a first half 30 and a second half 32 connected to first half 30 for movement between an opened position (FIGS. 2 and 5) and a closed position (FIGS. 3, 4, and 6). In the preferred embodiment, first half 30 is pivotally connected to second half 32 in any suitable fashion.

First half 30, preferably constructed from a rigid, sturdy metal, includes a top 34 with downwardly depending side walls 36, 38, defining a bar-receiving area A (FIG. 2). Each side wall includes an aperture 36a, 38a, respectively, for a purpose which will become evident below. Side wall 38 and corresponding aperture 38a are more easily seen in FIG. 5 where mounting member 22 has been turned 90° from the view shown in FIG. 2. A pair of aligned apertures 40, 42 on either side of half 30 receive generally cylindrical bosses 44, 46, respectively, each of which includes a longitudinally-knurled portion which is not shown, but will be understood to engage half 30 internally thereof. Similarly knurled portions internally of apertures 40, 42 (not shown) engage the knurled bosses and prevent the same from rotating when inserted therein. Furthermore, both bosses 44, 46 include a series of radially-disposed knurls for frictionally engaging the forks of a bicycle described in more detail below.

A lever 48 is pivotally mounted on first half 30 and is movable between an opened position shown in FIGS. 2 and 2A, and a closed position shown in FIG. 2B. A recess 50 receives lever 48 when it is in the closed position. FIGS. 2A and 2B show lever 48 in more detail where it may be seen to be mounted on first half 30 so that it is pivotable about a point 48a which represents a conventional mounting pin which passes through a bore in lever 48 and is captured in an aperture in first half 30. A clip 52 is formed from a flat metal member which includes two curled end portions 54a, 54b. Curled portion 54a is wrapped securely around a pin 48b which is, in turn, secured to lever 48. Curled portion 54b is spaced from portion 54a and defines a hook or latch which extends downwardly from first half 30 as shown. Lever 48 may be seen to have a generally cammed construction adjacent pivot point 48a and pin 48b which moves curled portion 54b relative to first half 30 when lever 48 is moved between the opened and closed positions. Such movement enables the lever and clip to latch and secure second half 32, when the second half is pivoted to the closed position and lever 48 is closed as shown in FIG. 2B. The latching and securing by lever 48 and clip 52 are indicated by the relative positions of clip 52 shown in FIG. 2B, where the dashed lines represent the clip's position when lever 48 is in the opened position, and the solid lines represent the clip's position when lever 48 is in the closed position. Such movement is attributable to the fact that when lever 48 is moved between the opened and closed positions, pivot point 48a remains in a constant position, as shown in FIG. 2B, whereas pin 48b, which carries clip 52, moves the clip upwardly and downwardly as shown.

The second part of lockable mount 18, i.e., lock-carrying member 24, will now be described by referring collectively to FIGS. 2 through 7 where the member may be seen to include a first end 26 and a second end 28 which are most easily seen in FIG. 2, where member 24 is shown apart from first half 30 and with a portion broken away. Member 24 is mounted on first half 30, and in the preferred embodiment includes an elongate, rod-like skewer 56 which is removably inserted through apertures 42, 40 in first half 30 (and bosses 46, 44 respectively), although any suitable manner of removably mounting the lock-carrying member on mounting member 22 (and not just on first half 30) would suffice. Additionally, member 24 may be fixedly mounted on mounting member 22 so that it may not be removed. It will further be appreciated that the lock-carrying member may be mounted on either side of mounting member 22. That is, skewer 56 is insertable first, through either of apertures 40 or 42, depending upon the orientation one desires for member 24, such as to accommodate a left- or right-handed person.

Member 24 includes a lock 58 most easily seen in FIG. 5, which is housed in a lock housing 60 mounted adjacent first end 26. Lock housing 60 is selectively movable along skewer 56 for a purpose described in detail below.

Figure 7:
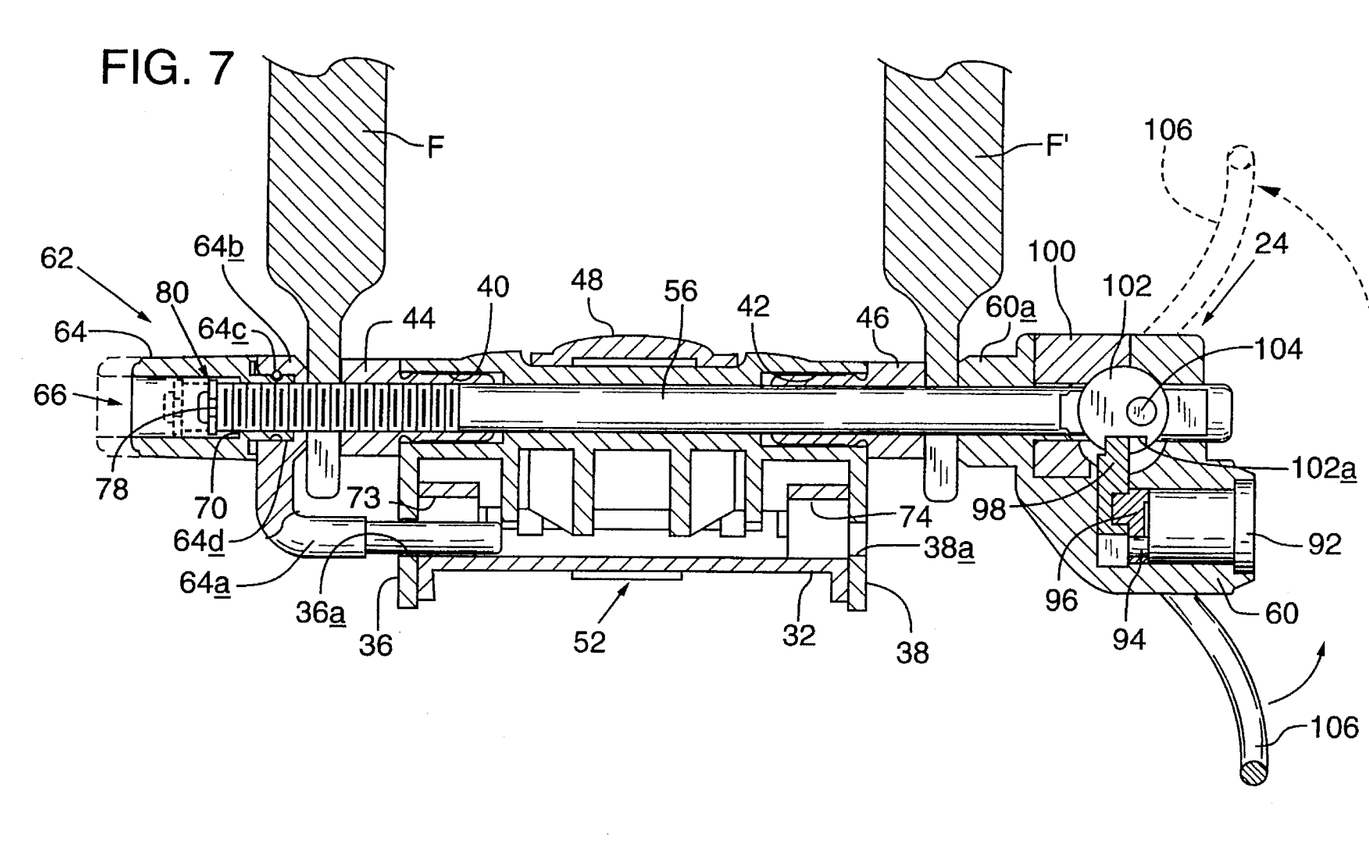
FIG. 7 is a view taken along line 7—7 in FIG. 6, showing the front forks of a bicycle engaged by the mount for carrying.
Figure 8:
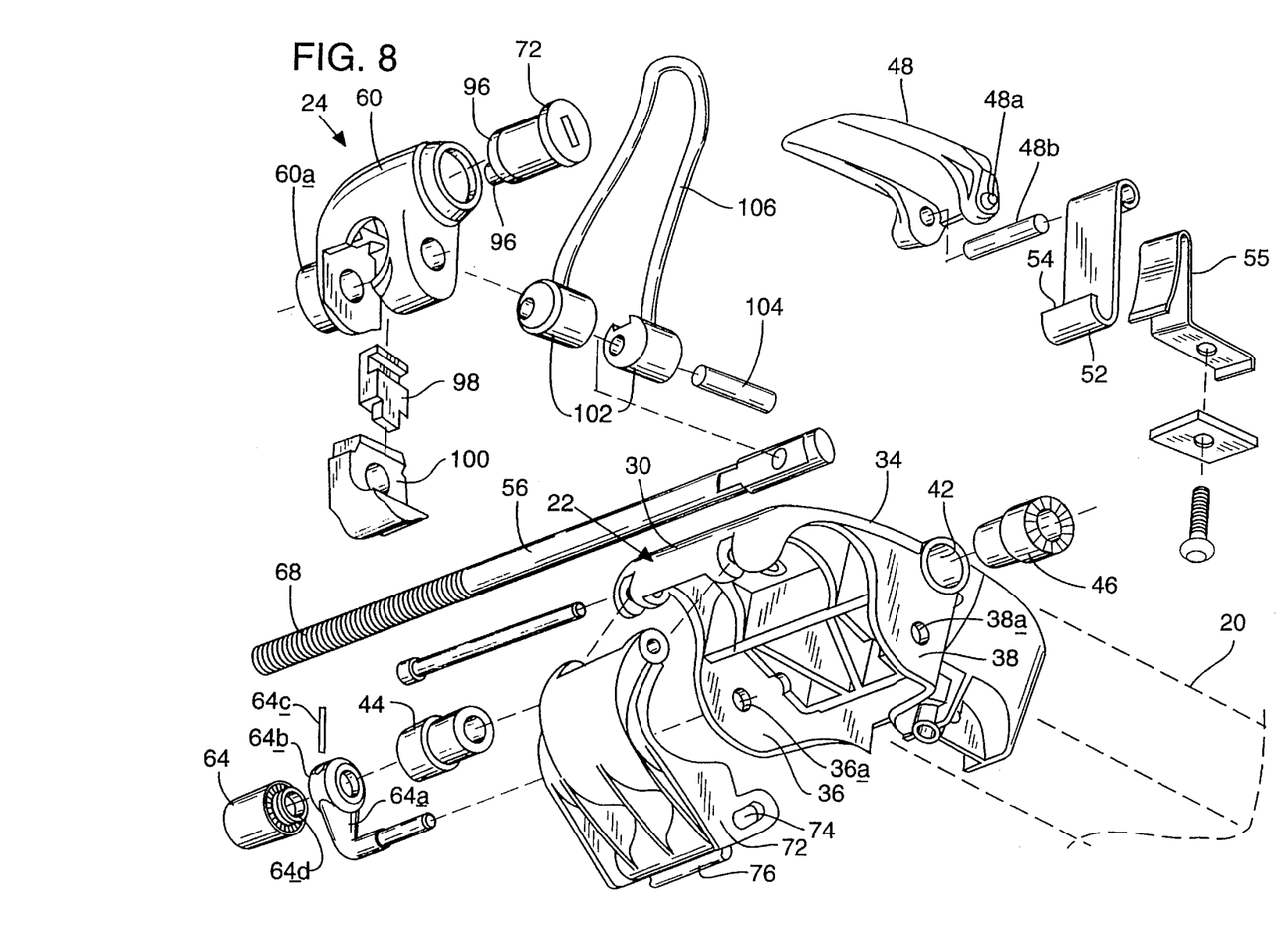
FIG. 8 is an exploded view of a lockable mount of the present invention.

Lock-carrying member 24 also includes an engagement member mounted adjacent second end 28 and indicated generally at 62 in FIG. 3, for selectively engaging first and second halves 30, 32 when second half 32 is in the closed position. Engagement member 62 includes a generally cylindrical knob 64 having a centrally-disposed bore 66 for receiving skewer 56 and allowing it to move reciprocally within. Knob 64 also includes a locking pin 64a which is insertable through either of apertures 36a, 38a (depending on how lock-carrying member 24 is mounted) for a purpose which will become more clear below. In the preferred embodiment, skewer 56 includes a threaded portion 68 adjacent second end 28, and knob 64 includes threads internally of bore 66 for engaging threaded portion 68 so that the knob may be threadably advanced a defined distance along skewer 56. Locking pin 64a, which is preferably an L-shaped member, is joined to a hub 64b connected to knob 64, and is non-rotatably advanceable by the knob, when the knob is rotatably advanced along the skewer. Such is achieved through a connection between knob 64 and hub 64b which is shown in FIG. 7. There it may be seen that knob 64 includes an inner cylindrical sleeve 64d which is insertable into a bore in hub 64b. Sleeve 64d includes an annular recess which is shown in cross-section, as a pair of generally semi-circular recesses on either side of the sleeve. A complementary-shaped recess appears internally of hub 64b, and defines together with the sleeve's annular recess, a generally circular aperture (as viewed in cross-section in FIG. 7), for capturing a pin 64c and thereby allowing locking pin 64a to be advanced with knob 64 a distance along skewer 56. That is, as knob 64 is turned for screw-threaded advancement, pin 64c engages both hub 64b and inner sleeve 64d so that the hub, and hence locking pin 64a, may be advanced along with knob 64 and along skewer 56. The distance along which knob 64 may be advanced is important insofar as preventing the mount from being removed from the bar to which it is secured, such distance being partially defined by a lip 70 internally of bore 66 which is shown in FIG. 7 and discussed below.

Second half 32 of mounting member 22 may be seen in FIGS. 2 through 6 to be pivotally connected to first half 30 for movement between an opened position (FIGS. 2 and 5) and a closed position (FIGS. 3, 4 and 6). Second half 32 forms a jaw or clamping plate, and as shown in FIGS. 2 and 5, includes side wall portions 71, 72 respectively, and each side wall portion includes an aperture 73, 74 respectively. A lip 76 is joined to second half 32 adjacent an unconnected edge, and is selectively engageable by clip 52, and more specifically curled portion 54b thereof, when half 32 is moved to the closed position as shown in FIG. 2B. Plural support ribs 32a through 32c are provided on the bottom of second half 32 and shown in FIG. 2, and span an area adjacent lip 76 lending support to a portion of half 32 which helps define bar-receiving area A. A conventional spring 55 is shown in FIGS. 2A and 2B and is captured, at one end, by washer 20a. The other end of the spring biases clip 52 in a direction generally toward second half 32 which maintains the clip in a position to engage lip 76.

FIGS. 4 and 7 show what will be referred to as stop structure, generally in the form of a groove 78 on skewer 56 adjacent second end 28, and a clip 80 which is insertable into groove 78 for restricting the advancement of knob 64 when the knob is advanced in a direction away from first and second halves 30, 32. As shown in FIG. 4, clip 80 defines a generally C-shaped structure which includes an almost-circular outer surface 82 and a non-uniformly-shaped inner surface 84, such non-uniformity being defined by plural ridges 86, 88, and 90 which engage skewer 56 in groove 78. FIG. 7 shows clip 80 engaging skewer 56 in groove 78 as just described. It will be appreciated that the diameter of outer surface 82, were it to be completely circular, is slightly less than the inner diameter of bore 66 so that clip 80 may be withdrawn, along with skewer end 28, and move within the bore such as is shown in FIG. 7. It will further be appreciated that the diameter of clip 80 just described, is dimensioned so that the clip will selectively engage lip 70 internally of bore 66 for a purpose described below.

FIG. 6 shows knob 64 advanced a distance away from first and second halves 30, 32 so as to define a space between the knob, and more specifically hub 6412 and boss 44 which is suitable for receiving a fork F on a bicycle. A similar space may be seen on the other side of half 30 and between a boss 60a on lock housing 60 and boss 46 for receiving the other fork F' on a bicycle. The forks may or may not include additional so-called retention devices which appear as raised nodules on the distal ends of the tines of forks F and F' in FIG. 6. The retention devices provide a safety feature which greatly reduces the chance that a tire will separate from the bicycle by engaging bosses on a bicycle, similar to bosses 44, 46, to prevent the separation of the forks and the tire. The retention devices also provide an additional feature which serves to ensure that the forks remain engaged with skewer 56.

FIG. 7 shows the above-described forks mounted on skewer 56. Also shown, in greater detail, is lock housing 60 on lock-carrying member 24 which may be seen to include a conventional key-driven lock chamber 92 connected to a driver 94, which is in turn operatively engaged by chamber 92 for rotatably driving an intermediate member 96 for driving a pillar 98, reciprocally, between a locked and an unlocked position. A cam housing 100 is mounted in lock housing 60 and provides a mount for a generally cylindrically-shaped cam 102 which is rotatably mounted on skewer 56 adjacent the first end thereof, and rotatable about a cam pin 104 which is offset from the center of cam 102. It will be understood that another cam, substantially the same as cam 102, is mounted on cam pin 104 and located on the opposite side of lock housing 60 as shown in FIGS. 5 and 6.

Cam 102 includes a slot 102a which runs longitudinally along a side thereof (and into the page as viewed in FIG. 7), and a loop or handle 106 is connected to cam 102 for moving or rotating the cam between the locked and unlocked positions. In the locked position, pillar 98 is insertable into slot 102a for locking the cam in place. In the unlocked position, pillar 98 is withdrawn from slot 102a and cam 102 and is free to rotate 180-degrees under the influence of handle 106 so that the slot would now face directly upwardly from the view shown in FIG. 7. The locked position is shown in FIG. 7 in solid lines and the unlocked position is shown in dashed lines. More specifically, the position occupied by handle 106, when the same is moved to the locked and unlocked positions are shown respectively in solid and dashed lines. Correspondingly, the respective positions occupied by knob 64 are similarly shown.

Describing these positions in somewhat more detail and the effect such positioning has, it will be appreciated that when the handle and cam are rotated out of the locked position, lock housing 60 is moved, because of the camming action, a short distance along skewer 56 and away from first and second halves 30, 32. Put another way, the skewer is shifted a short distance relative to lock housing 60. This distance is known as the throw or range of the cam and defines a space between the lock housing and boss 46 on first half 30. Preferably the throw is around 0.25-inch, although any throw which allows mount 18 to behave in the way described below will suffice. It will be appreciated that a 0.25-inch throw provides sufficient clearance between the retention devices near the ends of the tines of each fork described above, and the mount, so that when the mount is unlocked, forks F, F' may be removed therefrom without any further manipulation of the mount, i.e., knob 64 does not have to be advanced away from the first and second halves any further. At this point it bears repeating that what is being described above is the preferred embodiment only, and that more generally, the invention finds wide utility in a number of other article-carrying scenarios mentioned briefly above. Additionally, while a throw of 0.25-inches has been found desirable when the mount is used to hold the forks of a bicycle in place, it will be appreciated that in other applications involving different articles, throw ranges might change depending on the nature of the articles carried by a particular rack, all of which are within the spirit and scope of the invention.

Lock-carrying member 24 and engagement member 62 cooperate and work together so that it is virtually impossible to remove first and second halves 30, 32 respectively, from the bar about which they are clamped, when the lock is locked, i.e., when pillar 98 engages slot 102a of cam 102. More specifically, it will be appreciated that due to the throw of the cam described above, when handle 106 is moved to the locked position, lock housing 60 will have moved a short distance toward first and second halves 30, 32. Even more specifically, and as shown in FIG. 7, in the locked position knob 64 and locking pin 64a, are advanceable along skewer 56, in a direction away from first and second halves 30, 32, only until lip 70 internally of bore 66 engages clip 80 to stop or restrict any further movement away from the first and second halves. It will be appreciated that when this engagement occurs, locking pin 64a remains intact and in position within aperture 36a in side wall 36, and within aperture 73 of side wall portion 71, so that second half 32 remains confined in the closed position and may not be opened.

In the unlocked position, corresponding to when handle 106 is moved to the position indicated in dashed lines in FIG. 7, knob 64 may be shifted a short distance away from first and second halves 30, 32, similarly shown in dashed lines, just far enough so that the locking pin may be withdrawn from aperture 73 in second half 32 so that the second half only now may be pivoted open allowing the mount to be removed from bar 16. That is, the only time that second half 32 may be pivoted open and hence removed from the bar about which it is clamped, is when knob 64 is screw-threadedly advanced far enough away from first and second halves 30, 32 so that lip 70 internally of bore 66 engages clip 80 to restrict the knob's further advancement (with locking pin 64*a* still in position within the apertures in first and second halves 30, 32), and handle 106 is moved to the unlocked position thereby shifting the skewer that extra bit so that knob 64 and hence locking pin 64*a* are advanced just far enough so the end of the locking pin is withdrawn from aperture 73 in second half 32, fleeing the second half so that it may be opened.

Operation

The lockable mount described above may be installed on a vehicle for providing an article-carrying rack in the following way. First, mounting member 22 is secured to tray 20 as described above and as shown in FIGS. 2A–B. In the preferred embodiment, tray 20 is suitable for carrying a bicycle although other articles may be carried on tray 20, or modified forms of tray 20 which are all within the spirit and scope of the invention. With tray 20 in place, skewer 56 is inserted through apertures 42, 40 (or 40, 42 depending on the desired orientation), as shown in FIGS. 2 and 3, and thereafter engagement member 62 is screw-threadedly advanced along the skewer until it reaches the position shown in FIG. 4, which causes locking pin 64*a* to be inserted into aperture 36*a* in first half 30 and aperture 73 in second half 32 (FIG. 2). When the engagement member, and more specifically knob 64, is advanced along the skewer as described, bore 66 in knob 64 permits the skewer end to extend into an area externally of the knob and bore for exposing a groove 78 in the skewer end for receiving a clip 80 (FIG. 4) so that the knob's advancement along the skewer may be subsequently restricted or stopped as described above.

Once clip 80 is in place and handle 106 is in the unlocked position, the knob may be advanced away from halves 30, 32 as shown in FIG. 5, so that second half 32 may be pivoted away from first half 30. Next, the halves may be mounted on bar 16, such as is shown in FIG. 6, and the halves secured together by moving second half 32 to the position shown in FIG. 2B, so that lip 76 is engaged by curled portion 54*b* on clip 52. By moving lever 48 to the closed position (shown in solid lines in FIG. 2B), clip 52 is drawn closer to the lever and second half 32 is secured firmly in place.

By advancing knob 64 as described above, two spaces are defined for receiving the forks of a bicycle. One space is between knob 64 and boss 44, and the other space is between lock housing 60 and boss 46. Such spaces allow the forks of a bicycle, such as those shown in FIG. 6 at F, F', to be mounted on skewer 56. After the forks are mounted on the skewer, knob 64 should be tightened completely. Now, by moving handle 106 to the locked position shown in FIG. 7, the throw of the cam described above causes the forks to be clamped even more tightly because the lock housing and skewer are shifted relative to one another, the effect of which is to bring the lock housing closer to first and second halves 30, 32. It will be appreciated that because of the throw of the cam and the dimensions of the engagement member, it is virtually impossible for the mount to be removed from a bar, when the mount is in the locked position.

From the above description, it should be clear that what has been described is an article-carrying rack with a lockable mount for securing the rack on a vehicle. The lockable mount, in the preferred embodiment, includes two halves 30, 32 which are pivotably connected for movement between an opened and a closed position. When the halves are in the closed position, an external bar 16 (FIG. 6) on the vehicle may be clamped therebetween for securing a tray connected to the mount, on the vehicle. Preferably the tray allows a bicycle to be carried thereon, but as discussed above, the rack is not limited to carrying only bicycles.

The mount includes a lock-carrying member 24, which in the preferred embodiment is a skewer, which is mounted, preferably removably, on first half 30 and is capable of clamping the forks of a bicycle thereon. The skewer carries at one end, a lock housing 60 which includes, as shown in FIG. 7, a key-driven lock chamber 92, a cam housing 100, and a cam 102 in the cam housing. Cam 102 is rotatably mounted on the skewer and is movable between a locked position and an unlocked position. Moving the cam between the locked and unlocked positions (or locking and unlocking the cam) defines what has been referred to above as the throw, which is simply the short distance the lock housing travels along the skewer when the cam is moved between the locked and unlocked position. This distance is important because at the other end of the skewer there is a knob which is screw-threadedly advanceable for bringing a locking pin 64*a* on the knob into engagement with the first and second halves when the halves are closed. This prevents the halves from being opened, which in turn prevents the mount from being removed from the bar about which it is clamped.

When cam 102 is locked, knob 64 and locking pin 64*a* may not be removed from the other end of the skewer because clip 80, mounted on the skewer internally of bore 66 in knob 64, engages lip 70 on knob 64 internally of bore 66 which prevents the knob's further advancement. In this position, the locking pin is dimensioned so that it still engages the first and second halves preventing them from being opened. When, however, cam 102 is unlocked, the throw moves lock housing 60 (in which the cam housing and cam are carried) a short distance away from the first and second halves allowing the skewer to be shifted relative to the halves, which in turn advances knob 64 just far enough away from first and second halves 30, 32 for locking pin 64*a* to dis-engage the second half so that it may be pivoted free of the bar.

Simply stated, when the cam (and hence the mount) is locked, the mount may not be removed from the bar about which it is clamped. Only when the cam (and hence the mount) is unlocked may the mount be removed from the bar about which it is clamped.

While the present invention has been described in the context of providing a lockable mount for carrying a bicycle, it is to be understood that other articles, such as luggage, skis, canoes, or rafts may be carried on racks which have a lockable mount as described above. Moreover, it is not essential to the invention that the rack be carried on a vehicle roof. Rather, such a rack with a lockable mount may be carried anywhere on a vehicle including the trunk, or even the cargo bed of a truck.

While the present invention has been shown and described with reference to the foregoing preferred embodiment, it is to be understood by those of skill in the art that other changes in form and detail may be made therein without departing from the spirit and scope of the invention as defined in the appended claims.

I claim:

1. A lockable mount for securing an article carrier to an external bar on a vehicle, the mount comprising:

a first half;

a second half connected to the first half for movement relative thereto between an opened and a closed position, wherein when the second half is in the closed position it is selectively engageable by the first half for securing the halves around the bar; and a lock-carrying member having a first and second end, wherein the member is mounted on the first half and includes a lock mounted adjacent the first end which is selectively movable along the member for varying the distance between the lock and the first half, and wherein the member may be locked to restrict such movement, and further wherein the lock-carrying member includes an engagement member mounted adjacent the second end for selectively engaging the first and second halves when the second half is in the closed position and confining the second half in such position when the member is locked.

2. The mount of claim 1, wherein the second half is pivotally connected to the first half and wherein the lock-carrying member is removably mounted on the first half, and further wherein the engagement member is adjustably mounted on the lock-carrying member for movement therealong, wherein such engagement member movement permits the same to selectively engage the first and second halves.

3. The mount of claim 2, wherein the engagement member includes a pin, and the first and second halves include apertures which are generally aligned when the second half is closed for receiving the pin so that the second half is confined in the closed position.

4. The mount of claim 3, wherein the lock-carrying member includes a rod-like skewer having a threaded portion adjacent the second end thereof, and wherein the engagement member is threadably advanceable therealong for moving the pin into engagement with the first and second halves.

5. The mount of claim 4, wherein the lock-carrying member includes stop structure adjacent the second end for restricting the engagement member's movement therealong and in a direction away from the first and second halves.

6. The mount of claim 5, wherein the stop structure includes, a groove on the skewer adjacent the second end, a clip which is insertable into the groove, and wherein the engagement member includes a knob connected to the pin, having a central bore through which the skewer passes, and wherein the bore includes a lip for engaging the clip for restricting the engagement member's movement.

7. The mount of claim 3, wherein the lock is movable a distance along the lock-carrying member which is around 0.25-inches, such distance permitting the engagement member to be adjusted relative to the lock-carrying member so that the pin thereon engages only the first half, thereby permitting the second half to be disengaged by the first half for movement to the opened position.

8. A lockable fork mount for securing a bicycle rack to an external bar on a vehicle, the mount comprising:

a first half;

a second half pivotally connected to the first half for movement between an opened and a closed position, wherein when the second half is in the opened position, the halves may be placed adjacent the bar, the second half being thereafter movable to the closed position where it may be engaged by the first half for securing the halves around the bar;

a skewer mounted on the first half, having a first and second end;

a lock housing which includes a lock, mounted on the skewer adjacent the first end and movable therealong within a range for defining a fork-receiving space between the housing and the first half, and wherein the lock may be locked to secure the housing on the skewer so that the same may not be moved therealong;

a knob adjustably mounted on the skewer adjacent the second end and advanceable therealong for defining another fork-receiving space between the knob and the first half; and a locking pin connected to the knob and adjustable therewith for engaging the first and second halves when the second half is in the closed position, and for preventing the second half from being opened when the lock is locked.

9. The mount of claim 8, wherein the skewer is elongate and includes a threaded portion adjacent the second end, and wherein the knob is threadably advanceable therealong by engagement with the threaded portion.

10. The mount of claim 9, wherein the lock housing includes a cam rotatably mounted on the skewer for moving the housing along the skewer and through the range.

11. The mount of claim 10, wherein the cam permits movement of the housing through a range of about 0.25-inches.

12. The mount of claim 11, wherein the knob includes a central bore through which the skewer passes for allowing the knob to be threadably advanced therealong.

13. The mount of claim 12 further comprising stop structure on the skewer adjacent the second end for limiting the knob's advancement along the skewer when the same is advanced in a direction away from the first and second halves, such structure for preventing the knob from being removed from the skewer and for maintaining the engagement between the locking pin and the first and second halves.

14. The mount of claim 13, wherein the stop structure includes, a groove on the skewer adjacent the second end, a clip insertable into the groove, and a lip internally of the bore for engaging the clip and limiting the knob's advancement along the skewer when the knob is advanced in a direction away from the first and second halves.

15. An article-carrying rack with a lockable mount for securing the rack to a vehicle, the rack comprising:

at least one stanchion mounted on the vehicle;

a bar mounted on the stanchion;

a tray for holding articles to be carried on the vehicle;

a mounting member connected to the tray having first and second halves which are movable between an opened and a closed position for engaging the bar and fixing the tray on the vehicle; and a lock-carrying member mounted on the mounting member, having one end which includes a lock and another end which includes a locking pin for engaging the first and second halves when the halves are in the closed position, and further for confining the halves in the closed position when the lock is locked.

16. The rack of claim 15, wherein the first and second halves are pivotally connected for movement between the opened and closed position.

17. The rack of claim 16 further comprising a knob connected to the locking pin, wherein the knob is advanceable along the lock-carrying member for bringing the locking pin in engagement with the first and second halves.

18. The rack of claim 17, wherein the lock-carrying member is removably mounted on the mounting member and includes a skewer and wherein the knob is screw-threadably advanceable along the skewer.

19. The rack of claim 18 further comprising stop structure on the skewer for limiting the knob's advancement therealong in a direction away from the first and second halves.

20. The rack of claim 19, wherein the stop structure includes, a groove on the skewer, and a clip which is insertable into the groove, and wherein the knob includes a centrally-disposed bore having a lip internally thereof, and wherein when the knob is advanced in a direction away from the first and second halves, the lip engages the clip for limiting the advancement of the knob along the skewer.

\* \* \* \* \*